D. P. DAVIES.
STEERING DEVICE FOR TRACTORS.
APPLICATION FILED APR. 19, 1915.
1,190,735.
Patented July 11, 1916.
3 SHEETS—SHEET 1.
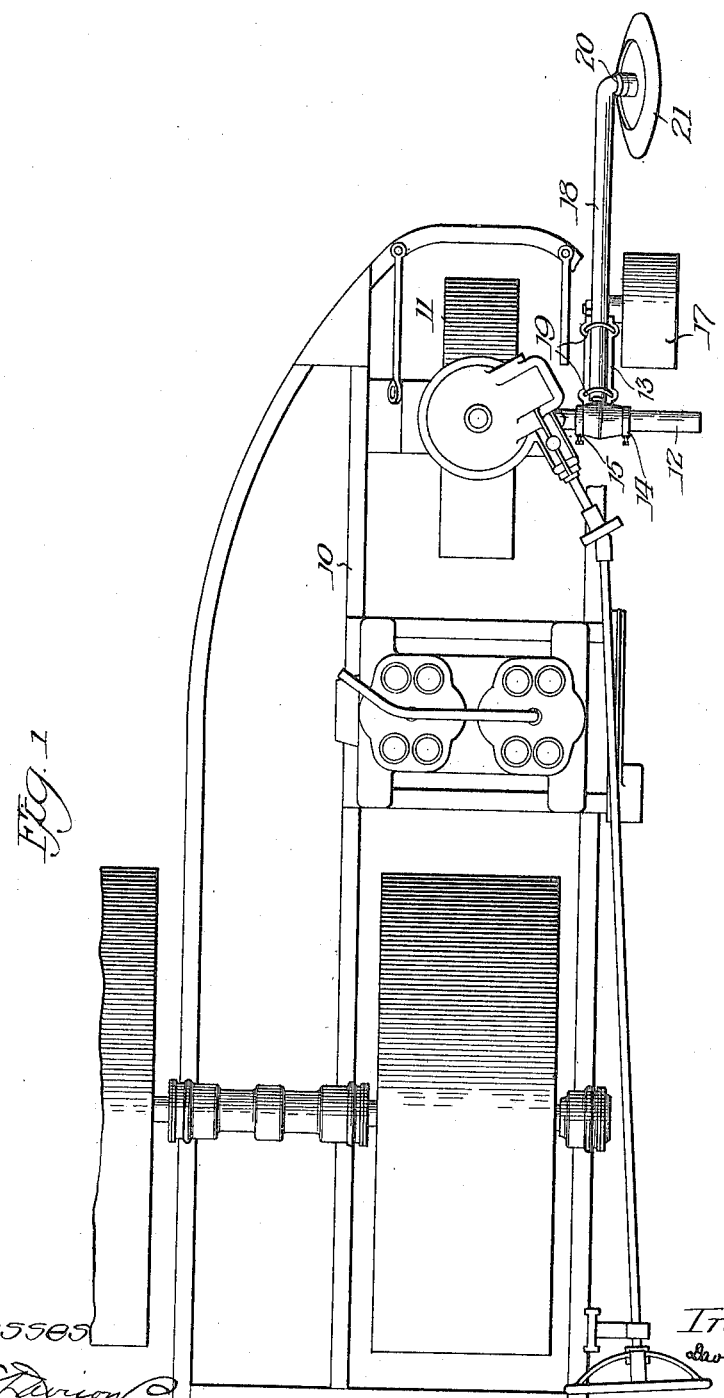

D. P. DAVIES.
STEERING DEVICE FOR TRACTORS.
APPLICATION FILED APR. 19, 1915.
1,190,735.
Patented July 11, 1916.
3 SHEETS—SHEET 2.
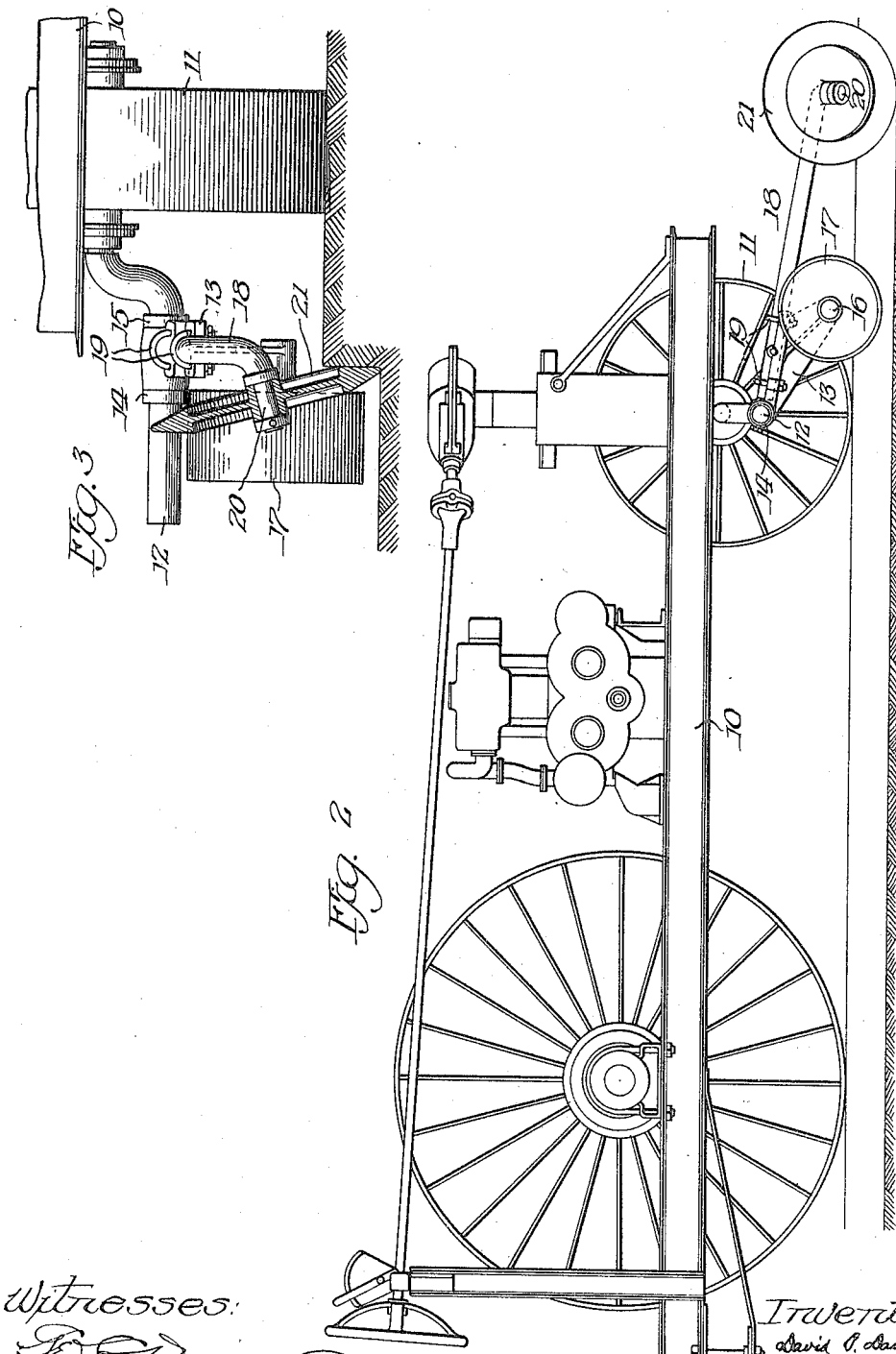

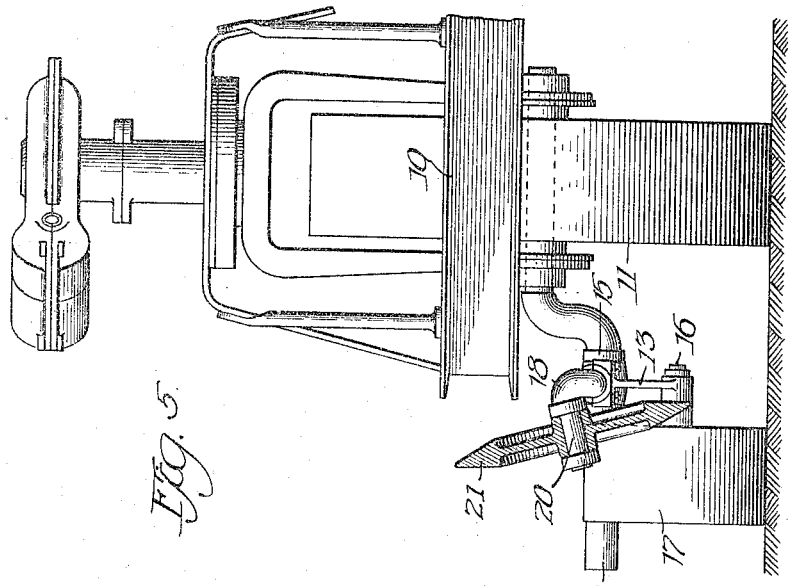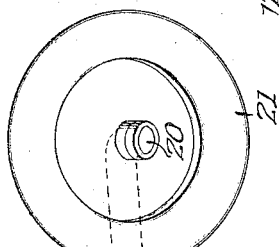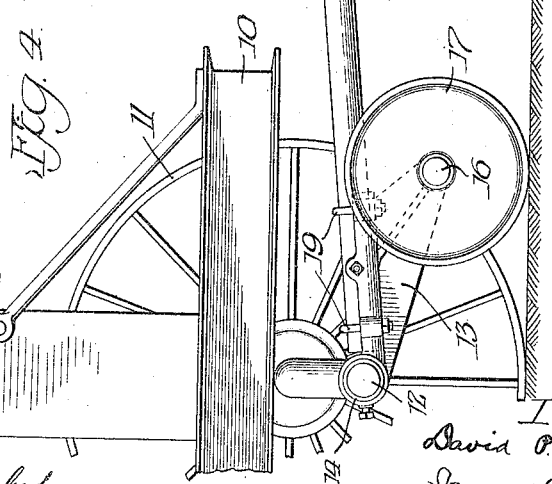

UNITED STATES PATENT OFFICE.

DAVID P. DAVIES, OF RACINE, WISCONSIN, ASSIGNOR TO J. I. CASE THRESHING MACHINE COMPANY, OF RACINE, WISCONSIN, A CORPORATION.

STEERING DEVICE FOR TRACTORS.

1,190,735.  Specification of Letters Patent.  Patented July 11, 1916.

Application filed April 19, 1915. Serial No. 22,325.

*To all whom it may concern:*

Be it known that I, DAVID P. DAVIES, a citizen of the United States, residing at Racine, in the county of Racine and State of Wisconsin, have invented certain new and useful Improvements in Steering Devices for Tractors, of which the following is a specification.

The object of my present invention is to provide a steering device for plowing engines, the guide or furrow wheel of which, when reaching the end of a furrow or when the engine is moving through unplowed land, will be automatically elevated from the earth and maintained in such position until the next furrow is reached, when said wheel will become automatically lowered into the furrow in position for guiding the engine, as usual, and which operations are accomplished without the use of chains or levers requiring manipulation by an operator manually, as is common, all as will hereinafter more fully appear.

In the accompanying drawings, forming a part hereof, Figure 1 is a plan of a traction engine with my improved steering device applied thereto; Figs. 2 and 3, side and front elevations, respectively, showing the guide-wheel in position in a furrow; and Figs. 4 and 5 are side and front elevations, respectively, showing said guide-wheel in elevated position when the tractor is moving over unplowed land.

In said drawings, 10 indicates a horizontally movable traction engine of any approved form, the forward steering wheel, 11, of which is supported by an extended axle, 12. Upon said steering-wheel axle 12 I loosely mount a supporting member, 13, capable of vertical movement which is held in position thereon by adjustable collars, 14 and 15, by which said steering device is permitted to be shifted laterally in relation to wheel 11 to accommodate the distance of the engine from the furrow when pulling a different number of plows; and, when it is desired to remove the steering device as a whole from said axle or to replace the same, this can be readily accomplished by removing the outside collar 14. Said support 13 is provided with a stud-shaft, 16, upon which is mounted a carrier-wheel, 17, and also connected to said support is a bent axle, 18, which is preferably held in position thereon by clamps, 19, and at the forward or bent end, 20, of said axle I suitably mount a guide or furrow-wheel, 21, of any usual or approved form and greater in diameter than said carrier-wheel.

When employing the engine for plowing, my improved steering device is applied thereto in the manner indicated, and, as the engine is moved along a furrow, the guide-wheel 21, which is pivotally supported from axle 12 and considerably greater in diameter than carrier-wheel 17, becomes seated on the bottom of the furrow so as to tread therealong as indicated in Figs. 2 and 3, and said carrier-wheel is caused to be sustained out of contact with the furrow as indicated also in said views, and in which position the device operates until the end of a furrow is reached. When said guide-wheel 21 strikes the earth elevation at the end of a furrow and moves upwardly thereover and on the unplowed land, the carrier-wheel 17 contacts with the end of the furrow and lifts and supports said guide-wheel in elevated position, as indicated in Figs. 4 and 5, carrying the same along the unplowed land thus elevated until the next furrow is reached, when said guide-wheel again seeks its lowermost position in the manner hereinbefore indicated.

In this manner I produce a steering device which is very simple and inexpensive in construction and efficient in operation, and which is capable of automatically adjusting its steering or guide-wheel as required under the varied conditions indicated without the employment of controlling devices or other means which of necessity must be operated manually.

I claim as my invention:

1. A steering device for tractors, comprising a horizontally movable tractor steering-wheel axle, a vertically movable supporting member connected to said axle, a carrier-wheel mounted upon said support and adapted to travel on unplowed land and carry said device therealong, a forwardly-extending axle connected to said support, and a guide-wheel mounted on said forwardly-extending axle in advance of said carrier-wheel and adapted to travel in a furrow and maintain said carrier-wheel from contact therewith and carry said device therealong.

2. A steering device for tractors, comprising a horizontally movable tractor steering-wheel axle, a vertically movable supporting member connected with said axle, a carrier-wheel mounted upon said support and adapted to travel on unplowed land and carry said device therealong, a forwardly-extending axle connected to said support and having its outer end bent, and a guide-wheel mounted upon said bent axle in advance of said carrier-wheel and adapted to travel in a furrow and maintain said carrier-wheel from contact with said furrow and carry said device therealong.

3. A steering device for tractors, including a horizontally movable tractor steering-wheel axle, a vertically movable carrier-wheel support mounted upon said axle, a carrier-wheel mounted upon said support and adapted to travel on unplowed land and carry said device therealong, a forwardly-extending axle communicating with said support, and a guide-wheel of greater diameter than said carrier-wheel mounted upon said forwardly-extending axle in advance of and in alinement with said carrier-wheel and adapted to travel in a furrow and maintain said carrier-wheel from contact therewith.

4. A steering device for tractors, including an extended horizontally movable tractor steering-wheel axle, a vertically movable carrier-wheel support mounted upon said axle and laterally adjustable thereon, a stud-shaft on said support, a carrier-wheel mounted upon said stud-shaft and adapted to travel on unplowed land and carry said device therealong, a forwardly-extending axle communicating with said support, and a guide-wheel mounted upon the outer end of said forwardly-extending axle and adapted to travel in a furrow and maintain said carrier-wheel from contact therewith.

5. A steering device for tractors, including a horizontally movable tractor steering-wheel axle extending laterally from said tractor, a vertically movable carrier-wheel support mounted upon and adjustable along said axle, a carrier-wheel mounted upon said support and adapted to travel on unplowed land and carry said device therealong, a forwardly-extending bent axle connected to said support and a guide-wheel mounted on said forwardly-extending axle in advance of said carrier-wheel and adapted to travel in a furrow and maintain said carrier-wheel from contact therewith.

In testimony whereof I affix my signature in presence of two witnesses.

DAVID P. DAVIES.

Witnesses:
M. ELHOLM,
J. A. WALSH.

Copies of this patent may be obtained for five cents each, by addressing the "Commissioner of Patents, Washington, D. C."